United States Patent
Quandt et al.

(10) Patent No.: US 8,494,678 B2
(45) Date of Patent: Jul. 23, 2013

(54) METHOD FOR MACHINING A CONTOUR ON AT LEAST ONE WORKPIECE BY MEANS OF A ROBOT

(75) Inventors: Stefan Quandt, Asslar (DE); Andreas Hoffmann, Solingen (DE); Joerg Reger, Wettenberg (DE)

(73) Assignee: ABB AG, Mannheim (DE)

( * ) Notice: Subject to any disclaimer, the term of this patent is extended or adjusted under 35 U.S.C. 154(b) by 470 days.

(21) Appl. No.: 12/669,585

(22) PCT Filed: Jun. 14, 2008

(86) PCT No.: PCT/EP2008/004799
§ 371 (c)(1),
(2), (4) Date: Jan. 19, 2010

(87) PCT Pub. No.: WO2009/010137
PCT Pub. Date: Jan. 22, 2009

(65) Prior Publication Data
US 2010/0206938 A1 Aug. 19, 2010

(30) Foreign Application Priority Data
Jul. 18, 2007 (DE) .......................... 10 2007 033 309

(51) Int. Cl.
*B23Q 15/22* (2006.01)
*B25J 19/02* (2006.01)
*B25J 13/08* (2006.01)
*G05B 19/4093* (2006.01)

(52) U.S. Cl.
USPC ........... 700/253; 700/252; 700/254; 700/259; 901/42; 901/43; 901/47

(58) Field of Classification Search
USPC .......................... 700/245–268; 901/42–43, 47
See application file for complete search history.

(56) References Cited

U.S. PATENT DOCUMENTS

| 4,380,696 | A | | 4/1983 | Masaki | |
|---|---|---|---|---|---|
| 4,532,405 | A | * | 7/1985 | Corby et al. | 219/124.34 |
| 4,568,816 | A | * | 2/1986 | Casler, Jr. | 219/124.34 |
| 4,590,356 | A | * | 5/1986 | Povlick et al. | 219/124.34 |
| 4,639,878 | A | | 1/1987 | Day et al. | |
| 4,673,795 | A | | 6/1987 | Ortiz | |
| 4,812,614 | A | * | 3/1989 | Wang et al. | 219/124.34 |

(Continued)

FOREIGN PATENT DOCUMENTS

| DE | 3618480 C2 | 5/1995 |
|---|---|---|
| DE | 10002230 A1 | 7/2001 |
| GB | 2087107 A | 5/1982 |
| GB | 2131571 A | 6/1984 |

OTHER PUBLICATIONS

International Search Report for PCT/EP2008/004799 mailed on Oct. 17, 2008.

*Primary Examiner* — Khoi Tran
*Assistant Examiner* — Dale Moyer
(74) *Attorney, Agent, or Firm* — Leydig, Voit & Mayer, Ltd.

(57) ABSTRACT

A process for working a contour on at least one workpiece using a robot includes positioning the workpiece relative to the robot; acquiring an actual position of the workpiece; acquiring a real course of the contour on the workpiece at predefined points using at least one sensor; and actuating the robot according to individual vectors so as to correct a robot motion during the working of the contour.

6 Claims, 2 Drawing Sheets

U.S. PATENT DOCUMENTS

| | | | |
|---|---|---|---|
| 4,834,686 A * | 5/1989 | Kautz et al. | 445/30 |
| 4,967,370 A * | 10/1990 | Stern et al. | 700/254 |
| 5,014,183 A * | 5/1991 | Carpenter et al. | 700/64 |
| 5,572,102 A * | 11/1996 | Goodfellow et al. | 318/568.13 |
| 5,715,375 A | 2/1998 | Ito et al. | |
| 5,948,287 A * | 9/1999 | Bandelin et al. | 219/121.64 |
| 2010/0075058 A1 * | 3/2010 | Rademacher et al. | 427/427.3 |
| 2011/0091657 A1 * | 4/2011 | Rademacher | 427/427.3 |
| 2011/0125322 A1 * | 5/2011 | Rademacher et al. | 700/245 |

* cited by examiner

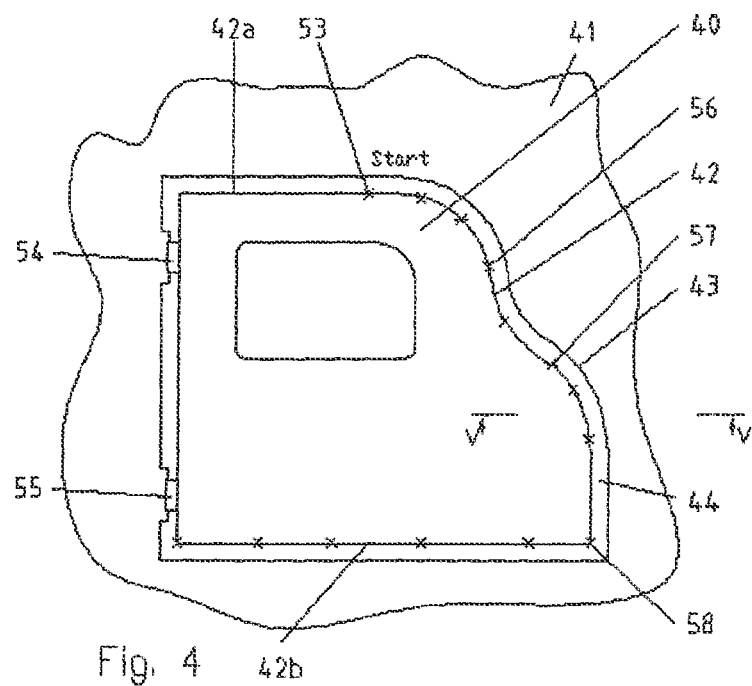
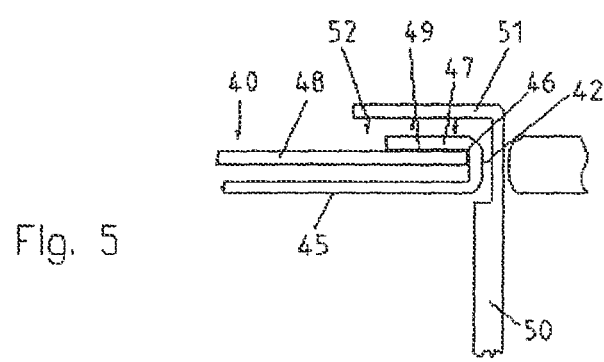

METHOD FOR MACHINING A CONTOUR ON AT LEAST ONE WORKPIECE BY MEANS OF A ROBOT

This application is a U.S. National Phase Application under 35 U.S.C. §371 of International Application No. PCT/EP2008/004799, filed on Jun. 14, 2008 and claims benefit to German Application No. DE 10 2007 033 309.0, filed on Jul. 18, 2007. The International Application was published in German on Jan. 22, 2009 as WO 2009/010137 under PCT Article 21 (2).

BACKGROUND

For the purpose of producing, for example, automobile bodies, body parts are so positioned in relation to one another in a receiving device that locations to be worked, for example edges to be welded to one another, are located in the working range of the robot arm. The robot arms moves with the tool, in this case a welding tip, along the line at which the two workpieces are to be welded to one another. Frequently, these lines are not rectilinear, but are curved according to the form of the body, such that a robot control system programmed thereto the robot tip can follow this curved line.

It is to be noted in connection therewith that no body part is identical to another, because of the existence of tolerances, deformations and the like.

For this purpose, for the working of body parts an ideal body is first produced, which body is so worked and processed that tolerances are brought almost to zero. This highly precisely produced ideal body, which is also referred to as a measurement body or measurement body-shell, serves the purpose of programming the robot motion.

When a real body is to be worked, this real body is assigned to the robot, or positioned, and image recordings, for example of the contours to be welded together, are produced by means of a plurality of cameras, as a result of which the misalignment can be identified. There is produced therefrom a mean positional vector, which corresponds to an average displacement or twist of the actual contour in relation to the contour of the ideal body, and which is input to the control system of the robot.

Accordingly, the robot tip is moved according to the mean positional vector. This can have the consequence that the robot tip does not travel exactly along the contour, it being the case that the deviations of the motion of the robot tip from the the contour are not to be too great.

SUMMARY OF THE INVENTION

An aspect of the invention is to create a process by means of which improved working, for example a body, can be effected.

Thus, according to the invention, the process for working a contour on at least one workpiece, particularly for welding or sealing a seam between two workpieces, particularly between two body parts, by means of a robot, is characterized by the following process steps:
  positioning in relation to the robot the workpiece that is to be worked, and/or acquiring the actual position of the workpiece,
  acquiring the real course of the contour on the workpiece, at predefined points, by means of at least one sensor, and determining the displacement vectors at the predefined points,
  actuating the robot according to the displacement vectors for the purpose of correcting the motion of the robot during the working of the contour.

If the contour of a real workpiece that is subject to tolerances is to be worked, the process is additionally characterized by the following steps:
  positioning in relation to the robot an ideally produced workpiece, as a reference workpiece,
  determining the ideal course of the contour in that the robot, by means of at least one sensor, acquires the course of the contour on the reference workpiece, at predefined points,
  positioning in relation to the robot the real workpiece that is subject to tolerances, and/or acquiring the actual position of the real workpiece,
  acquiring the real course of the contour on the workpiece, at the predefined or other points, by means of at least one sensor, and thereby acquiring the deviation of the real course from the ideal course at the predefined points,
  calculating displacement vectors corresponding to the deviations, and
  actuating the robot according to the displacement vectors for the purpose of correcting the motion of the robot during the working of the contour.

These displacement vectors correspond to the tolerances that occur in the case of the real workpiece, compared with the so-termed ideal workpiece. By means of the displacement vectors, the motion of the tool at the robot tip is matched to the real course of the contour to be worked. In comparison with the known process, in which a mean displacement vector or positional vector is calculated, a displacement vector is assigned to each individual predefined point, such that, overall, the working becomes more accurate.

In the case of an automobile body, the process is performed in such a way that each contour of the ideal body is defined at particular measurement points, in that the measurement point is acquired by means of a camera or a plurality of cameras; in the case of the real body, the corresponding measurement points are likewise acquired in the same manner and are provided with their respectively own individual or displacement vector, or are calculated, such that the component tolerances and fitting tolerances of the entire body can be compensated.

A particularly advantageous development of the invention can be achieved, in the case of the working of an invisible, covered contour course, for example an invisible seam on an automobile body, close to a visible contour, in that visible points of the visible contour are first acquired and measured, and the position of the invisible seam is calculated therefrom.

In this case, expediently, the visible contour of the real workpiece can be divided into a plurality of sectors and a partial measurement of certain points can be performed in each sector, as a result of which correction values are determined for each sector, such that workpiece and positional tolerances are determined and the course of the robot motion is calculated.

The measuring of the visible points is effected by means of a laser camera, and is operated on and mathematically processed by means of a triangulation measurement process that is known per se.

BRIEF DESCRIPTION OF THE DRAWINGS

The invention, further advantageous developments and improvements, as well as further advantages, are explained more fully and described with reference to the drawing, wherein some exemplary embodiments of the invention are represented and wherein:

FIG. 4 shows a side view of an automobile door, and FIG. 5 shows a sectional view according to the section line V-V of FIG. 4.

DETAILED DESCRIPTION

Figure 1:
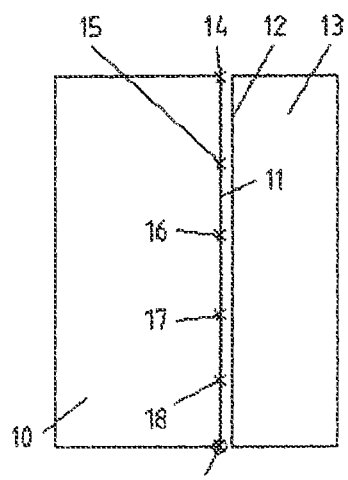
FIG. 1 shows a top view of an ideal workpiece.

A workpiece 10, which may be, for example, an automobile body or the like, is represented here as a rectangular, flat component that is to be welded, at a longitudinal edge 11, to the longitudinal edge 12 of a further workpiece 13. The two workpieces 10 and 13 have straight, linear edges 11 and 12, and, accordingly, they can also be referred to as so-termed ideal workpiece parts.

A robot arm, not represented here, travels with a sensor, which may be, for example, a camera, along the lines 11 and 12 and, starting from the start point 14, makes images at predefined locations 15, 16, 17, 18 and 19, the signals of which images are stored in a memory.

A real workpiece 20 differs from the ideal workpiece 10 in that the edge 21 corresponding to the edge 11 has been altered in comparison with the ideal edge 11', insofar as the real edge 21 has an S shape, which intersects the ideal edge 11' at certain points 11" and 11'".

Figure 2:
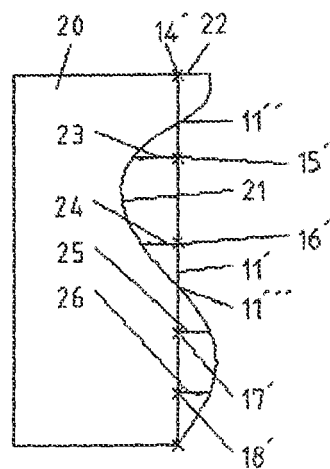
FIG. 2 shows a top view of a real workpiece that is to be worked, with positional vectors represented.
Figure 3:
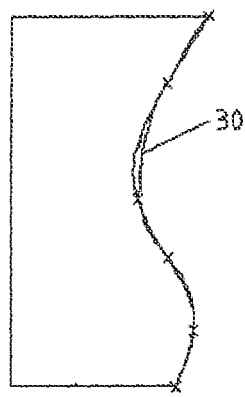
FIG. 3 shows the workpiece according to FIG. 2, with the actual guide path of the robot tool.

The robot, with the sensor, travels along the curve 11', and images are recorded at the same points 14', 15', 16', 17', 18' and 19' by means of the camera, the signals belonging to the images likewise being stored in a memory. The actual contour 21 deviates from the ideal contour, this being calculated by comparison of the so-termed ideal signals with the real signals, as a result of which there are calculated positional vectors 22, 23, 24, 25 and 26, by which the contour to be traveled by the robot is displaced from the ideal points to the real points. There is thereby obtained a motional path 30, as shown by FIG. 3, the motional path constituting, between the individual measurement points in each case, a straight line that is approximated to the real curve or real contour 21. A better approximation of the motional path of the robot to the actual contour can be achieved by increasing the number of measurement points. The motional path of the robot according to FIG. 1 can also be referred to as a training pass; the next step according to FIG. 2 is a measuring pass, in which the real workpiece contour is measured, and the motional path 30 according to FIG. 3 is the corrected path 30, along which the robot travels in the case of application.

The mode of operation of the invention has been described above with reference to a very simple workpiece part. It is represented in FIG. 1 that the two edges of the workpiece parts are close to one another; in reality, the edges overlap one another, such that spot-welding work can be performed at the corresponding locations and the corresponding contours.

A particular case is the sealing of a so-termed concealed seam. For this, reference is to be made to FIGS. 4 and 5. FIG. 4 shows a top view of a door 40 within a body 41, a gap 44, which is to be realized to be as narrow as possible, being constituted between the peripheral edge 42 of the door and the inner edge 43 of the body 41, which inner edge is matched to the outer contour of the door 40. A sectional view according to the section line V-V is represented in FIG. 5. The door 40 in this case has an outer plate 45, which is bent over inwards in an L shape at the end edges 42, so as to form a U shape 46 having a free limb 47 extending parallelwise in relation to the door surface. The outer plate 45 is complemented to form the door in that there is provided an inner plate 48, which engages in the U shape 46, such that the limb 47 overlaps a partial region of the inner plate 48. The limb 47 may, if necessary, be connected to the inner plate 48 by adhesive bonding or by a spot-welding process. A narrow gap 49 is formed in this case, through which moisture might be able to enter the inner space between the outer plate 45 and the inner plate 48. For this purpose, it will be necessary to seal the gap 49, or also the seam 49, this being effected here by means of an L-shaped tool 45, provided on the L-shaped limb 51 of which there is a slot, not shown in greater detail, through which sealing material 52, indicated by arrows, can emerge and cover the seam 49.

The seam 49 in this case is a so-termed concealed seam, which cannot be detected by a sensor.

In this case, the contour 42 of the door is detected and acquired at certain measurement points, which are indicated by crosses in FIG. 5. The start of the acquisition of the contour 42 is the start point 53, and a certain number of measurement points, the number of which depends on the course of the contour 42, is acquired by means of a sensor, according to the curved contour 42, which is opposite the hinge-points 54 and 55 of the door 40. After the individual measurement points, of which only the measurement points 56, 57 and the end measurement point 58 are denoted by way of example, have been acquired and the signals, determined by the sensor, have been stored in a memory, the measurement points are displaced computationally in consideration of the positional vectors, see FIG. 2, that have been acquired in this region, and the motion of the tool 55 is thereby calculated. The tool is then appropriately passed into the gap 44 and arranged as represented in FIG. 5, such that the limb 51 extends parallelwise in relation to the limb 47, and the tool 50, in the gap 44, travels along the contour 42 according to the newly calculated, real contour, the sealing material 52 being brought to the gap from behind. Clearly, the same is also effected for the contour 42a in the upper region of the door 40 and for the contour 42b in the lower region of same.

LIST OF REFERENCES 10 workpiece
11 longitudinal edge/lines
11' ideal edge
12 longitudinal edge/lines
13 further workpiece
14 start point
15 predefined location
16 predefined location
17 predefined location
18 predefined location
19 predefined location
20 real workpiece
21 real edge
22 positional vector
23 positional vector
24 positional vector
25 positional vector
26 positional vector
30 motional path
40 door
41 body
42 end edge
42a contour in the upper region of the door 42b contour in the lower region of the door
43 inner edge
44 gap
45 outer plate
46 U shape
47 limb
48 inner plate
49 gap/seam
50 tool
51 L-shaped limb
52 sealing material
53 start point
54 hinge-point
55 hinge-point
56 measurement point
57 measurement point
58 end measurement point

The invention claimed is:

1. A process for working a contour on at least one workpiece using a robot, the process comprising:
   positioning a workpiece relative to the robot;
   acquiring an actual position of the workpiece;
   acquiring a real course of a visible contour on the workpiece at predefined points using at least one sensor; and
   actuating the robot according to individual vectors so as to correct a robot motion during the working of the contour, wherein the contour is an invisible covered contour disposed close to the visible contour, and
   wherein the acquiring the real course of the visible contour includes acquiring and measuring visible points of the visible contour and calculating a position of the invisible covered contour based on the visible points,
   wherein the working includes one of welding and sealing a seam between the workpiece and a further workpiece, and
   wherein the workpiece and further workpiece include two automotive body parts.

2. The process as recited in claim 1, further comprising transporting the workpiece using a conveyor system into a robot station including the robot.

3. The process as recited in claim 1, further comprising dividing the visible contour into a plurality of sectors and performing a partial measurement of certain points in each one of the plurality of sectors so as to determine a correction value for each one of the plurality of sectors so as to determine workpiece and positional tolerances and calculate a course of the robot motion.

4. A process for working a contour on at least one workpiece using a robot, the process comprising:
   positioning the workpiece relative to the robot;
   acquiring an actual position of the workpiece;
   acquiring a real course of a visible contour on the workpiece at predefined points using at least one sensor; the acquiring the real course of the visible contour includes acquiring and measuring visible points of the visible contour and calculating a position of an invisible covered contour based on the visible points;
   actuating the robot according to individual vectors so as to correct a robot motion during the working of the contour, wherein the contour is the invisible covered contour disposed close to the visible contour;
   positioning an ideally produced workpiece as a reference workpiece in relation to the robot;
   determining an ideal course of the contour using the robot to acquire a reference contour of the reference workpiece using at least one sensor at predefined points, wherein the acquiring the real course of the contour is performed so as to acquire a deviation of the real course from the ideal course at the predefined points; and
   calculating at least one additional individual vector corresponding to the deviation, wherein the actuating includes actuating the robot according to the at least one additional individual vector so as to correct the robot motion during the working of the contour.

5. The process as recited in claim 4, wherein the acquiring the actual position includes using at least one position sensor to determine the actual position of the workpiece.

6. A process for working a contour on at least one workpiece using a robot, the process comprising:
   positioning the workpiece relative to the robot;
   acquiring an actual position of the workpiece;
   acquiring a real course of a visible contour on the workpiece at predefined points using at least one sensor; and
   actuating the robot according to individual vectors so as to correct a robot motion during the working of the contour, wherein the contour is an invisible covered contour disposed close to the visible contour, and
   wherein the acquiring the real course of the visible contour includes acquiring and measuring visible points of the visible contour and calculating a position of the invisible covered contour based on the visible points, and
   wherein the invisible covered contour is an invisible seam on an automobile body.

* * * * *